_United States Patent_ [19]

Hamilton

[11] 4,411,325

[45] Oct. 25, 1983

[54] LOAD BAR MOUNTING ASSEMBLY

[75] Inventor: Martin W. Hamilton, Arlington Heights, Ill.

[73] Assignee: Eaton Corporation, Cleveland, Ohio

[21] Appl. No.: 355,706

[22] Filed: Mar. 8, 1982

[51] Int. Cl.[3] ............................................. G01G 21/02
[52] U.S. Cl. ................................... 177/136; 177/211; 177/DIG. 9
[58] Field of Search ................ 177/136, 211, DIG. 9, 177/246; 73/862.65

[56] References Cited

U.S. PATENT DOCUMENTS

| | | | |
|---|---|---|---|
| 3,661,220 | 5/1972 | Harris | 177/136 |
| 3,743,041 | 7/1973 | Videon | 177/136 |
| 4,258,814 | 3/1981 | Dillon | 177/211 X |
| 4,363,369 | 12/1982 | Susor | 177/211 X |

Primary Examiner—Joseph W. Hartary
Attorney, Agent, or Firm—Fay & Sharpe

[57] ABSTRACT

A plurality of load bar assemblies (14) are connected between a supported structure (10) and a supporting structure (12) for determining an amount of load in the supported structure. Each load bar assembly includes a load bar (20) having a middle portion (22) connected with the supported structure and end portions (24, 26) connected by load bar mounting assemblies (34) with the supported structure. Each load bar mounting assembly includes a fulcrum member (50) which supports the load bar end portion on a fulcrumming surface (54). An elongated connecting structure (60) having an enlarged upper portion (64) extends through a load bar end portion aperture (32) and a fulcrum member aperture (56) and is connected with the supporting structure. An annular washer (72) and a tubular sleeve (74) of resilient material are disposed between the elongated connecting structure and the load bar end portion to allow limited movement therebetween.

20 Claims, 5 Drawing Figures

LOAD BAR MOUNTING ASSEMBLY

BACKGROUND OF THE INVENTION

This invention pertains to the art of resilient mounting assemblies. The invention finds particular application in the mounting of load or weigh bars and will be described with particular reference thereto. It is to be appreciated, however, that the invention finds application in mounting other associated structures in which limited relative movement from flexing, vibration, expansion, or the like is to be permitted.

Heretofore, various structures including vehicles and stationary structures have been outfitted with weighing devices including load bars. Commonly, a structure which holds a material which is to be weighed is connected with a central portion of the load bar. The lower surface of the load bar is generally flat except for a downward extending fulcrum projection at each end. The fulcrumming projections rest on a second or supporting structure. A resilient mounting connects the ends of the load bar and the second structure together while allowing limited movement therebetween. Strain gauges are bonded to the load bar between the central and end portions to measure the flexing of the load bar under an applied load. The change in the electric properties of the strain gauges caused by deflection of the load bar is readily converted by well known circuitry to an indication of the applied load. An exemplarly prior art load bar mounting assembly is illustrated in U.S. Pat. No. 3,661,220, issued May 9, 1972 to Carl R. Harris.

The lower surface of the prior art load bars are commonly machined flat to provide a smooth surface to facilitate bonding the strain gauges. One problem with the prior art mounting assemblies is that machining the lowr surface flat in the central portions but with downward extending fulcrum portions at the ends is relatively difficult and expensive.

The resilient mounting between the load bar and the supporting structure allows limited movement which tends to wear the fulcrum projection. Another problem with the prior art load bar mounting assemblies is that replacement of the entire load bar is required to repair a worn fulcrum projection. The detailed machining required to produce the load bar and the accurate placement and the bonding of the strain gauges render the load bar a relatively expensive element to replace.

The present invention contemplates a new and improved load bar mounting assembly which overcomes the above referenced problems and others yet is relatively easy and inexpensive to install and replace.

SUMMARY OF THE INVENTION

In accordance with the present invention there is provided a load bar mounting assembly for supporting the end portions of a load bar on a supporting structure. The end portions each have a lower surface and define an aperture therethrough. A fulcrum member has a base side which is adapted to engage the supporting structure, a fulcrumming surface which is adapted to engage the end portion lower surface, and defines a fulcrum aperture extending therethrough. An elongated connecting structure has an elongated central portion which is adapted to extend through the end portion and fulcrum member apertures, an enlarged portion adjacent one end for constraining separating movement of the end portion lower surface and the fulcrumming surface, and a connecting means adjacent the other end which is adapted to be connected with a supporting structure. A resilient interconnecting means is disposed between at least a portion of the enlongated connecting means and the load bar end portion adjacent the end portion aperture. In this manner, the load bar and supporting structure are resiliently interconnected and the fulcrum member is readily replaceable.

In accordance with a more limited aspect of the invention, there is provided a plurality of load bar mounting assemblies connected between a hopper structure and a vehicular supporting structure.

One advantage of the present invention is that it facilitates replacement of fulcrumming structures between load bars and their associated supporting structures.

Another advantage of the present invention is that it simplifies manufacturing of load bars.

Still further advantages of the present invention will become apparent to others upon reading and understanding the following detailed description of the preferred and alternate embodiments.

BRIEF DESCRIPTION OF THE DRAWINGS

The invention may take form in various parts and arrangements of parts. The drawings are only for purposes of illustrating preferred and alternate embodiments of the present invention and are not to be construed as limiting the invention.

DETAILED DESCRIPTION OF THE PREFERRED AND ALTERNATE EMBODIMENTS

Figure 1:
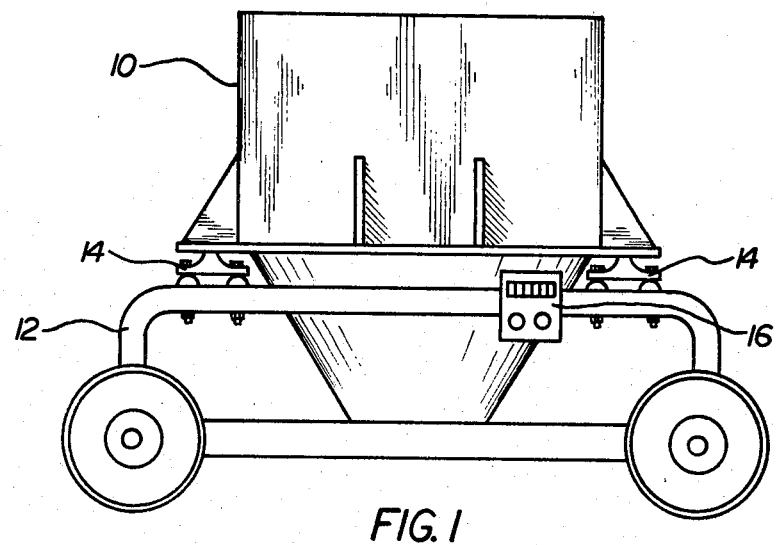
FIG. 1 illustrates a vehicular structure which incorporates a plurality of load bar mounting assemblies in accordance with the present invention for use in determining the weight of carried loads.

FIG. 1 illustrates a vehicle which includes a first or supported structure 10 and a second or supporting structure 12. A plurality of load bar assemblies 14 are mounted between the supporting and supported structures. An electronic display module 16 is mounted on the supporting structure and electrically connected with the load bar assemblies to produce an indication of the load being carried by the supported structure. In the embodiment of FIG. 1, the supported structure is a hopper which is adapted to carry grain, feed, or other particulate materials. The electronic controller 16 produces an indication of the weight of the carried particulate material. Alternately, the load bar assemblies can be mounted between supported and supporting structures of platform scales, stationary tanks or hoppers, tank trucks, trailers, rail cars, and the like.

Figure 2:
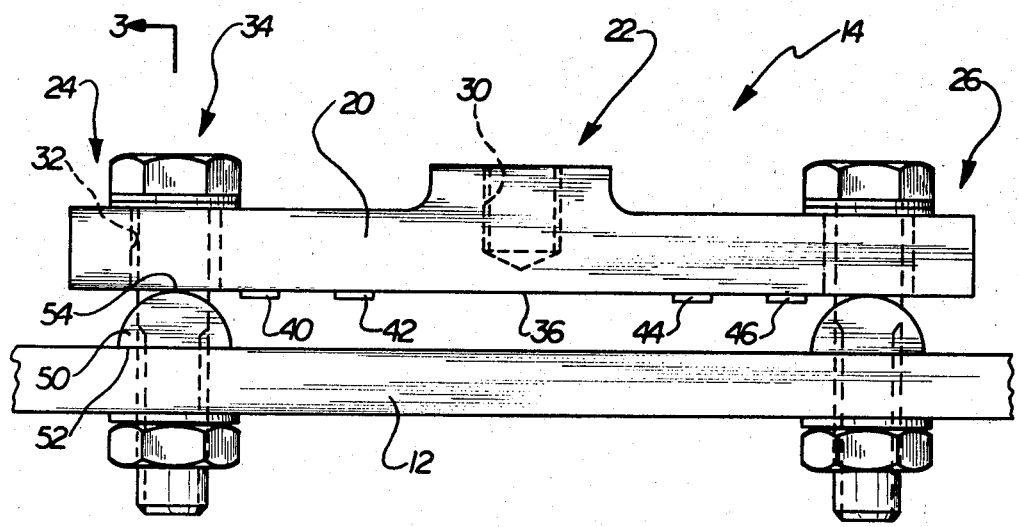
FIG. 2 is a side view of a load bar mounting assembly in accordance with the present invention.

With particular reference to FIG. 2, the load bar assembly 14 includes a load bar 20 having a middle portion 22, a first end portion 24 and a second end portion 26. The load bar middle portion is tapped with a threaded bore 30 or other means for facilitating interconnection with the supported structure. Because the first and second end portions are the same, a portion 24 will be described and it is to be appreciated that the description applies equally to the second end portion 26. The end portion defines an aperture 32 which receives a load bar mounting assembly 34. A load bar lower surface 36 is machined flat from the first end portion to the second end portion. A plurality of strain gauges 40, 42, 44, and 46 are bonded to the lower surface such that their electric properties are altered as the load bar 20 is flexed. The output of each strain gauge commonly varies as the bending moment, i.e. forces times moment arm. The outputs of the strain gauges 40 and 42 are electrically connected together such that the bending moments which they measure are substractively combined. This difference is proportional to the load multiplied by the spacing between the strain gauges 40 and 42, a readily controlled constant. The pair of strain gauges 44 and 46 also electrically are connected for subtractive combination. The two pairs of strain gauges are electrically connected for additively combining the outputs. Thus, the output of the combined four strain gauges is equal to the carried weight times a first constant plus a second constant. This output is readily converted to a direct measurement of weight by appropriately selecting the gain with which the output is multiplied and by appropriately selecting an offset bias.

Figure 3:
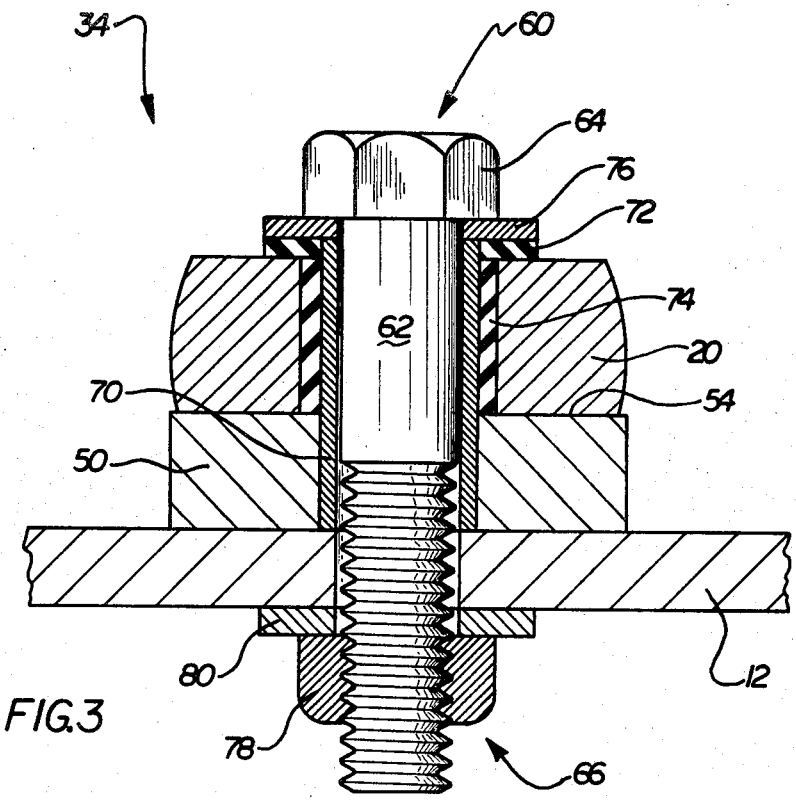
FIG. 3 is a sectional view through section 3—3 of FIG. 2.
Figure 4:
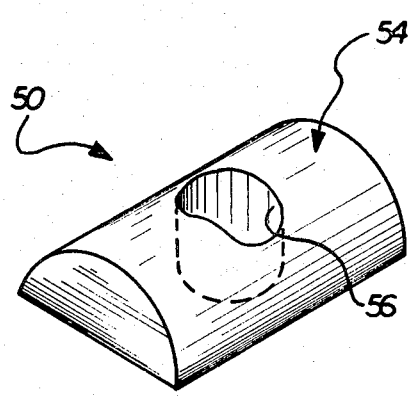
FIG. 4 is a perspective view of the fulcrum member of FIG. 2.

With reference to FIGS. 2, 3, and 4, the mounting assembly 34 includes a fulcrum member 50. The fulcrum member has a base side 52 which rests upon the supporting structure 12 and a relatively narrow fulcrumming surface 54 which supports the load bar lower surface. Preferably, the fulcrum member is a prism with a semiround transverse cross section such that a generally arcuate fulcrumming surface is provided. In the embodiment of FIGS. 2, 3, and 4, the fulcrumming member is a half cylinder with a semicircular transverse cross section, although other semiround cross sections such as semi-elliptical, semioval, piece-wise semiround and the like are also contemplated. Alternately, the fulcrum member may be a prism with a generally triangular or trapezoidal transverse cross section which presents a relatively narrow fulcrumming surface for the load bar lower surface to rest upon. The fulcrum member defines a central aperture 56 therethrough which is, in the preferred embodiment, centered traversely on the apex of the half cylinder and centered longitudinally along the fulcrumming surface. The fulcrum member is constructed of material of the same hardness as the load bar, preferably hardened steel.

With particular reference to FIG. 3, the load bar end portion aperture 32 and the fulcrum member aperture 56 are disposed in axial alignment to receive an elongated connecting means 60. The elongated connecting means includes an elongated central portion 62, an enlarged portion 64 at one end, and a connecting means 66 adjacent its other end for connecting it with the supporting structure 12. A spacing means 70 fixes the space or distance between the enlarged portion and the supporting structure to be a small distance larger than the altitude of the fulcrum member plus the thickness of the load bar end portion. In the preferred embodiment, the spacing means 70 is a tubular sleeve which is press fit into the fulcrum aperture 56. The tubular sleeve extends between the enlarged portion 64 and the supporting structure 12 to fix the relative spacing. The diameter of the tubular spacing sleeve is selected smaller than the end portion aperture 32 to provide an annular gap therebetween. This permits limited relative movement between the load bar and the remainder of the load bar mounting assembly. A gap between the enlarged portion 64 and the load bar end portion 24 is filled with a resilient material such as an annular disc 72 of polymeric or rubber material, e.g. urethane or neoprene. The annular gap between the tubular spacer and the load bar end portion is filled with a sleeve 74 of resilient polymeric or rubber material such as urethane or neoprene.

In the preferred embodiment, the elongated central portion 62 is the threaded shaft of a bolt. The enlarged portion 66 is a bolt head whose effective diameter is increased by a rigid, metal washer 76. The connecting means 64 includes a nut 78 which is threadingly received on the bolt shaft and a lock washer 80.

With this configuration, as the load bar bends or flexes, the resilient material compresses inhibiting load forces from being transmitted to the enlongated connecting means. Rather, substantially all load forces are applied to the fulcrumming surface 54. As the load bar flexes, the point of contact between the load bar lower surface 36 and the fulcrumming surface may roll slightly along the arcuate cross section.

Figure 5:
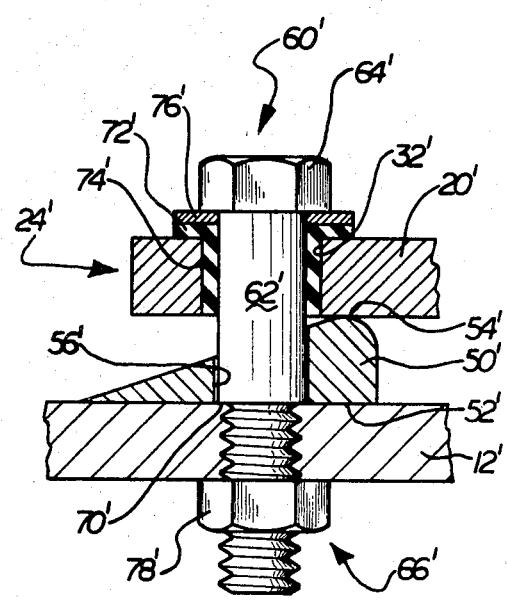
FIG. 5 illustrates an alternate embodiment of a load bar mounting assembly in accordance with the present invention.

FIG. 5 illustrates an alternate embodiment of a load bar mounting assembly in accordance with the present invention. In the embodiment of FIG. 5, like elements with elements of the embodiment of FIGS. 1 through 4 are denoted with a like reference numeral but followed by a prime ('). The mounting assembly includes a fulcrum member 50' which has a base side 52', and a fulcrumming surface 54'. The fulcrum member is a prism with a generally triangular transverse cross section. A fulcrum member aperture 56' is disposed offset from the fulcrumming surface 54'. An elongated connecting means 60' such as shoulder bolt extends through an aperture 32' in the end portion of the load bar and the fulcrum aperture 56'. The shoulder bolt has a elongated central portion 62', an enlarged portion or bolt head 64' at one end and a connecting means 66' adjacent its other end for connecting it with the supporting structure 12'. In the embodiment of FIG. 5, the connecting means 66' includes a threaded end portion of the shoulder bolt which is threadedly received in a threaded bore in the supporting structure 12' and a locking nut 78' for locking the shoulder bolt against rotation relative to the supporting structure. The shoulder bolt has a shoulder which functions as a spacing means 70' for fixing the distance between the supporting structure 12' and the enlarged portion 64' to a distance which is slightly longer than the height of the load bar end portion and the fulcrum member. A resilient washer 72' is disposed between the enlarged portion 64' and the load bar end portion 24'. A resilient interconnecting means including an annular disc portion 72' and sleeve portion 74' is disposed between the elongated connecting means and the end portion aperture 32'.

The invention has been described with reference to the preferred and alternate embodiments. Obviously, modifications and alterations will occur to others upon reading and understanding the preceding specification. It is intended that the invention be construed as including all such alterations and modifications which come within the scope of the appended claims or the equivalents thereof.

Having described the preferred and alternate embodiments, the invention is now claimed to be:

1. A load bar mounting assembly for mounting end portions of a load bar on a supporting structure which end portions each have a lower surface and define an aperture therethrough, the mounting assembly comprising:
- a fulcrum member having a base side which is adapted to engage the supporting structure, a fulcrumming surface which is adapted to engage the end portion lower surface, and defining a fulcrum member aperture extending therethrough;
- an elongated connecting means having an elongated central portion which is adapted to extend through the end portion aperture and the fulcrum member aperture, an enlarged portion adjacent one end for constraining separating movement of the end portion lower surface and the fulcrum surface, and a connecting means adjacent the other end which is adapted to be connected with the supporting structure; and,
- a resilient interconnecting means which is disposed adjacent at least a part of the elongated central portion and the enlarged portion and which is adapted to engage the load bar end portion adjacent the end portion aperture for resiliently interconnecting the load bar end portion and the elongated connecting means.

2. The load bar mounting assembly as set forth in claim 1 wherein the fulcrum member has a generally semiround transverse cross section, the fulcrumming surface being disposed substantially along the apex of the semiround cross section.

3. The load bar mounting assembly as set forth in claim 1 wherein the resilient interconnecting means includes an annular disc of resilient material disposed between the enlarged portion and the load bar end portion.

4. The load bar mounting assembly as set forth in claim 3 wherein the elongated connecting means includes a spacing means for spacing the supporting structure and enlarged portion by a distance generally equal to the height of the fulcrum member, load bar end portion, and the annular resilient disc.

5. The load bar mounting assembly as set forth in claim 4 wherein the spacing means is a tubular sleeve extending between the supporting structure and the enlarged portion.

6. The load bar mounting assembly as set forth in claim 5 wherein the resilient interconnecting means further includes an annular sleeve of resilient material disposed between at least a portion of the tubular spacing sleeve and the surface of the load bar end portion which defines the end portion aperture.

7. The load bar mounting assembly as set forth in claim 6 wherein the elongated connecting means further includes a bolt, the enlarged portion includes a bolt head and rigid washer and the connecting means includes a threaded end portion of the bolt and a nut.

8. A load bar assembly comprising:
- a load bar having at least first and second end portions, each end portion having a lower surface and defining a aperture therethrough, a middle portion which is adapted to be connected with a first associated structure, and a plurality of strain gauges disposed between the middle and end portions;
- a fulcrum member having a base side engaging a second associated structure, a fulcrum surface engaging the end portion lower surface and defining an aperture therethrough in alignment with the end portion aperture;
- an elongated connecting means having an elongated central portion extending through the end portion aperture and the fulcrum member aperture, an enlarged portion connected adjacent one end of the central portion and disposed adjacent the end portion for constraining separating movement of the end portion lower surface and the fulcrumming surface, and a connecting means adjacent the other end of the central portion for connecting the central portion with the second associated structure; and,
- a resilient interconnecting means disposed between the load bar end portion and the elongated connecting means and for resiliently interconnecting the load bar and the elongated connecting means.

9. The load bar assembly as set forth in claim 8 wherein the first associated structure is a supported structure and the second associated structure is a supporting structure.

10. The load bar assembly as set forth in claim 8 wherein the fulcrum member has a semiround transverse cross section.

11. The load bar assembly as set forth in claim 10 wherein the fulcrumming surface extends along an apex area of the semiround cross section and wherein the fulcrum aperture extends transverse through the apex area.

12. The load bar assembly as set forth in claim 8 wherein the fulcrum member has a generally triangular transverse cross section.

13. The load bar assembly as set forth in claim 8 wherein the elongated connecting means includes a spacing means for fixing the distance between the enlarged portion and the second associated structure.

14. The load bar assembly as set forth in claim 13 wherein the elongated connecting means includes a shoulder bolt and the spacing means includes a shoulder on the shoulder bolt for engaging the second associated structure.

15. The load bar assembly as set forth in claim 13 wherein the spacing means is a tubular sleeve.

16. The load bar assembly as set forth in claim 15 wherein the tubular sleeve is press fit into the fulcrum member aperture.

17. The load bar assembly as set forth in claim 13 wherein the resilient interconnecting means includes an annular sleeve of resilient material disposed between the surface of the load bar end portion which defines the end portion aperture and at least a portion of the elongated connecting means central portion.

18. The load bar assembly as set forth in claim 17 wherein the resilient interconnecting means further includes an annular disc of resilient material disposed between an upper surface of the load bar end portion and the elongated connecting means enlarged portion.

19. The load bar assembly as set forth on claim 18 wherein the elongated connecting means enlarged portion includes a rigid washer.

20. In a vehicle which includes a supported hopper structure and a wheel mounted supporting structure, a plurality of load bar assemblies connected between the hopper and supporting structure for detecting an amount of load in the hopper structure, each load bar mounting assembly comprising:
- a load bar having at least first and second end portions, each end portion having a lower surface and defining a aperture therethrough, a middle portion which is adapted to be connected with the hopper structure, and a plurality of strain gauges disposed between the middle and end portions;

a fulcrum member having a base side engaging the supporting structure, a fulcrum surface engaging the end portion lower surface and defining an aperture therethrough in alignment with the end portion aperture;

an elongated connecting means having an elongated central portion extending through the end portion aperture and the fulcrum member aperture, an enlarged portion connected adjacent one end of the central portion and disposed adjacent the load bar end portion for constraining separating movement of the end portion lower surface and the fulcrumming surface, and a connecting means adjacent the other end for connecting the central portion with the supporting structure; and, a resilient interconnecting means disposed between the load bar end portion and the elongated connecting means for resiliently interconnecting the load bar and the elongated connecting means.

* * * * *